June 8, 1926.

W. E. HORNER 1,588,368

BELT TIGHTENER AND COUPLER

Filed July 20, 1925

WITNESSES

INVENTOR
W. E. Horner,
BY
ATTORNEYS

Patented June 8, 1926.

1,588,368

UNITED STATES PATENT OFFICE.

WILLIAM ELMER HORNER, OF TONKAWA, OKLAHOMA.

BELT TIGHTENER AND COUPLER.

Application filed July 20, 1925. Serial No. 44,819.

My invention is a belt tightener and coupler, and it consists in the combinations, constructions and arrangements herein described and claimed.

An object of the invention is the provision of a simple, reliable and easily operable device which will afford facilities for drawing the ends of a belt toward each other while the belt is trained about pulleys to tighten the belt as desired and which also will afford facilities for coupling the end portions of a belt to firmly hold the belt taut after the tightening means of the device has been detached from the belt.

A still further object of the invention is the provision in a device of the character described of an improved means for coupling the ends of a belt so that the belt will be kept desirably taut without any projecting elements being placed on the inner side of the belt or in position to contact with a pulley on which the belt may travel.

Other objects and advantages of the invention will be apparent from the following description, considered in conjunction with the accompanying drawings, in which—

Figure 1:
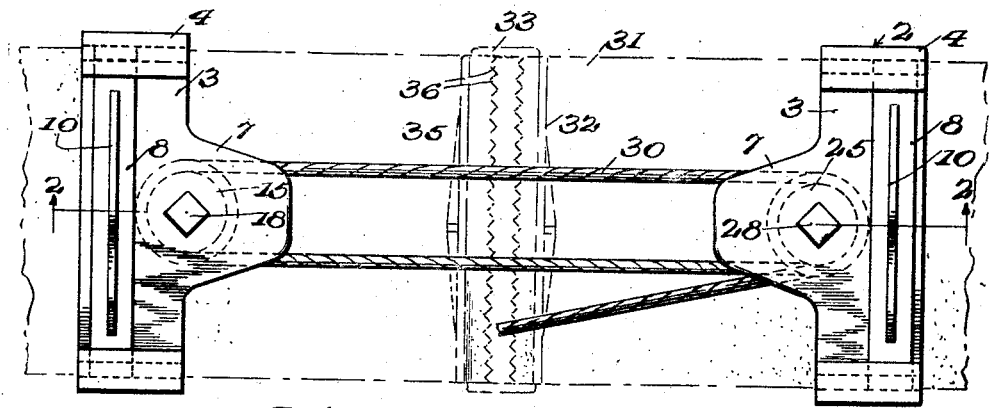
Figure 1 is a plan view showing in full lines the tightening means of the device and showing in dotted lines the coupling means of the device and a belt to which the device is applied.

The improved belt tightener and coupler comprises a pair of tightening units, generally indicated at 1 and 2 respectively. Each of these tightening units includes a belt gripping member or clamp which comprises a base plate 3 having a pair of upturned side members 4 which are formed to produce lateral slots 5 at the inner sides of the side members 4. These slots 5 extend the full length of the side members 4 and terminate at their bottoms flush with the upper face of the base plate 3, which is smooth and plane. Each slot 5 is enlarged upwardly for part of its width from its outer side, as indicated at 6. The top wall of this vertically enlarged portion 6 of the slot 5 is inclined from one end thereof to its opposite end and constitutes a cam surface for a purpose to be presently stated. The top wall of the remainder of the slot 5 also may be inclined in the same direction and is so shown (see Fig. 2).

The base plate 3 may be prolonged intermediate the side members 4 at the end of the base plate which is proximate to the highest portions of the slots 5. The upper face of such prolongation, which is indicated at 7, lies in the same plane as the upper face of the remainder of the base plate.

The base plate 3 together with the prolongation 7 and the side members 4 comprise the lower section of a belt gripping member or clamp. The upper section of the belt gripping member or clamp comprises a clamping plate or bar 8 having a length but slightly less than the distance between the side walls of the slots 5, whereby this clamping bar 8 is adapted to be slid flatwise close to the base plate 3 of the same belt gripping member with the end portions of the clamping bar 8 disposed in the slots 5 and with the end walls of the clamping bar 8 in sliding contact with the side walls of the slots 5.

Figure 2:
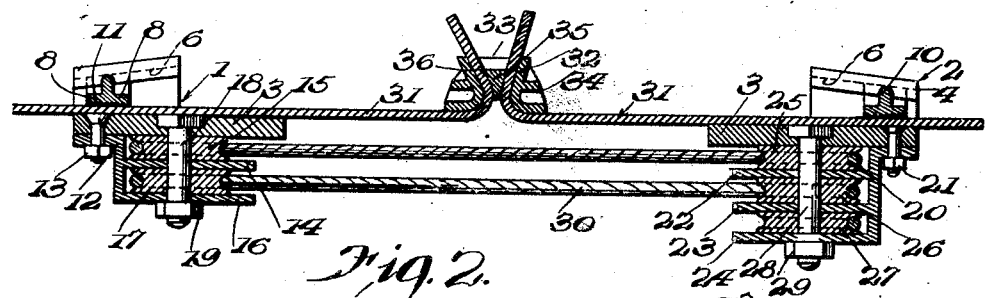
Figure 2 is a section substantially along the line 2—2 of Figure 1.
Figures 3, 4, 5:
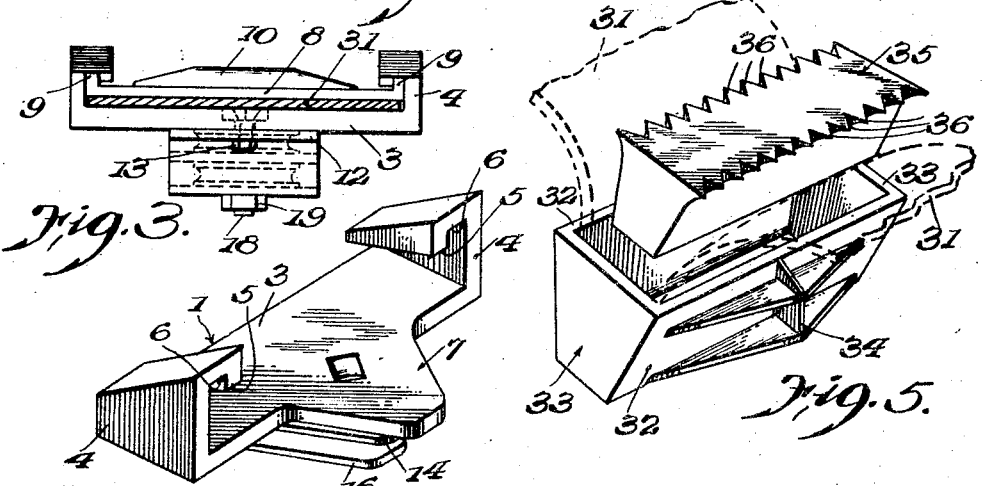
Figure 3 is an end elevation of one of the units of the tightening means of the device, showing in transverse vertical section a belt with which said tightening unit is engaged.
Figure 4 is a perspective view of the base section of the tightening unit exhibited in Figure 3.
Figure 5 is a perspective view of the coupler which is comprised in the device, showing the holding member of the coupler raised from active position and showing in dash lines the ends of a belt in position to be coupled together by means of said coupler.

The clamping bar 8 has transversely extending cam members 9 on the opposite end portions thereof adapted to move in the enlarged portions 6 of the slots 5 over the lower section of the belt gripping member, the upper surfaces of the cam members 9 being inclined from end to end in the same manner as the top walls of the vertically enlarged portions 6 of the slot 5. Each bar 8 is formed with a longitudinally extending rib 10 which not only is adapted to serve as a handle, whereby the upper section of each belt gripping member can be conveniently manipulated but also serves to reinforce and stiffen the bar 8. The clamping bar 8 is provided with longitudinally extending teeth 11 as best seen in Figure 2.

It will be manifest that when the clamping bar 8 of each belt gripping member is moved flatwise between the side members 4 of the associated lower section of the same belt gripping member with the upper faces of the cam members 9 in sliding contact with the upper walls of the enlarged portion 6 of the slot 5, the clamping bar 8 will be moved downward toward the associated base plate 3 when the clamping bar is moved in one direction across the base plate and the clamping bar 8 will be moved away from the base plate 3 when the clamping bar 8 is moved in the opposite direction across the base plate 3.

A bracket 12 is secured against the lower face of the base plate 3 of the tightening unit 1 by means of a bolt and nut, such as indicated at 13, the head of the bolt being countersunk in the upper face of the base plate 3. The bracket 12 has an arm 14 which is spaced from the lower face of the base plate 3 so that a space is provided between the arm 14 and the base plate 3 for the reception of a pulley 15. Bracket 12 also has a second arm, indicated at 16, which is spaced from the arm 14 so that a space is provided between the arms 14—16 for a second pulley, indicated at 17. The pulleys 15 and 17 are axially aligned and are rotatably supported on a short shaft which may be the shank of a bolt 18. The bolt 18 extends through the bores of the pulleys 15 and 17 and through aligned openings in the arms 16 and 14 of the bracket 12 and the base plate 3, the head of the bolt being countersunk in respect to the upper face of the base plate 3 and the bolt being held against displacement by means of a nut 19 which is in threaded engagement with the lower end portion of the bolt. It is to be observed at this point that the opening in the base plate 3 through which the bolt 18 extends is formed in the base plate at the juncture of the main portion of the base plate with the prolongation 7 and the arms 14 and 16 extend underneath the prolongation.

The tightening unit 2 has a bracket 20 which is secured to the underface of the base plate 3 of the tightening unit 2 by means of the bolt and nut 21. The bracket 20 has an arm 22 which is spaced from the lower face of the associated base plate 3. The bracket 20 also comprises an arm 23 spaced from the arm 22 and an arm 24 spaced from the arm 23. A pulley 25 is disposed between the arm 22 and the adjacent base plate 3. A second pulley 26 is disposed between the arms 22 and 23 and a third pulley 27 is disposed between the arms 23 and 24 of the bracket. The pulleys 25, 26 and 27 are rotatably supported on the shank of a bolt 28 which extends through aligned openings in the base plate 3 of the tightening unit 2, the arms 22, 23 and 24 of the bracket unit 2 and through the bores of the pulleys 25, 26 and 27, respectively. A nut 29 is in threaded engagement with the lower end portion of the bolt 28 and the head of the bolt is countersunk in respect to the upper face of the base plate 3 of the belt tightening unit 2. The opening in the base plate 3 of the belt tightening unit 2 is at the juncture of the prolongation 7 of such base plate with the main portion of the base plate and the arms 22, 23 and 24 extend underneath the prolongation 7 of the associated base plate.

A tightening cable 30 is trained about the pulley 25, then the pulley 15, then the pulley 26 and finally the pulleys 17 and 27 in turn and the tightening units 1 and 2 thus will be adjustably connected with the prolongations 7 of the base plates of the respective tightening units at the adjacent ends of such plates and with the highest ends of the enlarged portions 6 of the slots 5 in the side members of the respective tightening units at the adjacent ends of such units. The ends 31 of a belt then are extended between the sections of the belt gripping units toward each other and the clamping members 8 of the respective belt gripping members are moved to position to clamp the end portions of the belt firmly against the base plates of the belt gripping members. One end of the cable 30 then may be secured to a fixed support and the other end of the cable 30 is attached to a source of power so that a pull will be exerted on the cable and the end portions of the belt will be drawn together and the belt will be stretched or tightened as desired.

The invention contemplates the provision of a novel and efficient coupler for holding the end portions of the belt connected together after the belt has been stretched or tightened so that the belt tightening units can be detached from the belt without permitting loosening of the tightened belt.

This coupler comprises a hollow body or frame which consists of a pair of side members 32 and a pair of end members 33 joined to each other integrally or otherwise and so formed as to produce a space within the body which is open at both its upper and lower ends and decreases uniformly in width from its upper end to its lower end. The sides 32 of the body of the coupler will be reinforced by web structures, such as indicated at 34 on the outer faces thereof. Such web structures also are adapted to serve as handles for the body of the coupler. A wedge-shaped holding member 35 is adapted to fit within the body of the coupler and to cooperate with the side walls of the latter to prevent withdrawal of the ends of the belt from the space within the body of the coupler when the ends of the belt have been extended through the body of the coupler from the lower end of the latter between the side walls of the body of the coupler and the holding member 35. The latter is of such length as to have sliding contact at its ends with the inner faces 33 of the body of the coupler. The wedge-shaped holding member 35 decreases in width from its upper end to its lower end and has laterally extending teeth 35 at its upper end adapted to bite into the end portions of the belt and thus to securely hold the end portions of the belt against slipping from positions between the sides of the holding member 35 and the sides of the body of the coupler when the holding member 35 is in position to clamp the ends of the belt against the side walls of the body of the coupler as shown to advantage in Figure 2. It will be observed that any pull on the end portions of the belt, tending to withdraw such end portions of the belt from the space within the body of the coupler, will tend to tighten the holding member 35 in the body of the coupler and that the end portions of the belt thus will be securely fastened to each other and the belt may be maintained desirably taut. The coupler will be disposed on the outside of the belt and therefore will not contact with pulleys, over which the belt may travel. Moreover, the coupled together active portions of the belt do not overlap but may move in the same plane. Therefore no obstructions are provided on the underside of the belt which would tend to cause undue wear on the belt or interfere with the movement of the belt about the periphery of a pulley.

Obviously, the invention is susceptible of embodiment in forms other than that which is illustrated in the accompanying drawings, and I therefore consider as my own all such modifications and adaptations thereof as fairly fall within the scope of the appended claim.

I claim:—

In a belt tightening member, a clamp comprising a base plate having upstanding side members formed to produce lateral slots at the upper sides of the base plate, said lateral slots having vertically enlarged portions at the outer sides thereof extending the full length of the slots, the upper walls of said vertically enlarged portion being inclined, and a clamping member having end portions received in said lateral slots, said clamping member having contact portions upstanding from the opposite ends thereof for engaging with the inclined upper walls of the vertically enlarged portions of said slots, whereby said clamping members will be forced toward said base plate when said contact members move toward the shorter ends of the vertically enlarged portions of said slots, said clamping member having longitudinally extending teeth in its lower face, and a bracket secured to the underside of said base plate, said bracket having an arm spaced from the underside of said base plate for cooperating with the latter to define a space for the reception of a pulley, and means for rotatably supporting the pulley.

WILLIAM ELMER HORNER.